(12) United States Patent
Takamatsu et al.

(10) Patent No.: US 7,691,948 B2
(45) Date of Patent: Apr. 6, 2010

(54) (METH)ACRYLIC FILM, AND MAKING FILM AND RECEPTOR SHEET USING THE SAME

(75) Inventors: Yorinobu Takamatsu, Sagamihara (JP); Hidetoshi Abe, Tendo (JP); Takahide Okuyama, Yamagata (JP); Yutaka Mori, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 638 days.

(21) Appl. No.: 10/569,113

(22) PCT Filed: Sep. 9, 2004

(86) PCT No.: PCT/US2004/029511
§ 371 (c)(1),
(2), (4) Date: Feb. 22, 2006

(87) PCT Pub. No.: WO2005/023913
PCT Pub. Date: Mar. 17, 2005

(65) Prior Publication Data
US 2006/0234076 A1    Oct. 19, 2006

(30) Foreign Application Priority Data

Sep. 9, 2003 (JP) .............................. 2003-316895
Aug. 24, 2004 (JP) .............................. 2004-243720

(51) Int. Cl.
C08J 5/18 (2006.01)
C08L 33/06 (2006.01)
B32B 27/30 (2006.01)
B41M 5/00 (2006.01)
G03G 7/00 (2006.01)

(52) U.S. Cl. ........................ 525/217; 525/221; 525/222; 524/514; 524/522; 524/523

(58) Field of Classification Search ................. 525/217, 525/221, 222; 524/514, 522, 523
See application file for complete search history.

(56) References Cited

U.S. PATENT DOCUMENTS

| 4,045,517 | A | * | 8/1977 | Guerin et al. ................ 525/203 |
| 4,339,365 | A |  | 7/1982 | Becher |
| 5,266,638 | A |  | 11/1993 | Niessner |
| 5,608,025 | A |  | 3/1997 | Kawanishi |
| 6,448,339 | B1 | * | 9/2002 | Tomita ........................ 525/217 |
| 2004/0202879 | A1 |  | 10/2004 | Xia et al. |
| 2006/0234076 | A1 |  | 10/2006 | Takamatsu et al. |

FOREIGN PATENT DOCUMENTS

| JP | 62-153376 | 7/1987 |
| JP | 08-48014 | 2/1996 |
| JP | 10-157018 | 6/1998 |
| JP | 10-310754 | 11/1998 |
| JP | 2001-213932 | 8/2001 |
| JP | 2001-337602 | 12/2001 |
| WO | WO 97/40090 | 10/1997 |
| WO | WO 98/51754 | 11/1998 |
| WO | WO 02/38382 | 5/2002 |
| WO | WO 2004/094549 | 11/2004 |
| WO | WO 2005/023913 | 3/2005 |

* cited by examiner

*Primary Examiner*—Nathan M Nutter
(74) *Attorney, Agent, or Firm*—Colene H. Blank

(57) ABSTRACT

To provide a film having high tensile strength and elongation characteristics. A methacrylic film formed of (A) a carboxyl group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having a carboxyl group, and (B) an amino group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having an amino group, wherein a mixing ratio of the component (A) to the component (B) is from 10:90 to 90:10 in terms of a weight ratio.

4 Claims, 1 Drawing Sheet

(METH)ACRYLIC FILM, AND MAKING FILM AND RECEPTOR SHEET USING THE SAME

BACKGROUND

The present invention relates to a (meth)acrylic film having excellent elongation characteristics, in addition to high tensile strength. The film of the present invention can be used as a base material of an adhesive tape in interior and exterior materials for buildings, facing materials for fittings, and interior and exterior materials for vehicles because it has the above-mentioned characteristics. It is also useful as a substitute of a polyvinyl chloride resin which evolves a harmful gas during incineration because it is free from halogen.

As described above, a vinyl chloride resin having good balance between the tensile strength and elongation characteristics has hitherto been used as the facing film. However, there has recently been pointed out such a problem that deadly poison such as dioxin and a harmful gas such as hydrogen sometimes evolve during incineration. Thus it has been studied to replace by a resin free from chlorine.

An acrylic resin is employed to solve such a problem and, for example, a decorative sheet comprising a base film made of an acrylic resin and a protective layer made of an acrylic resin laminated on the surface of the base film and decorative sheet comprising a base film made of an olefinic resin and a protective layer made of an acrylic resin laminated on the surface of the base film are disclosed. See, for example, Japanese Unexamined Patent Publication (Kokai) No. 8-48014 and Japanese Unexamined Patent Publication (Kokai) No. 10-157018.

In case the acrylic resin is formed into a film, the resulting film is scarcely fit for use as a decorative sheet because it is rigid and brittle. To improve brittleness of the acrylic resin and to impart flexibility to the acrylic resin, a rubber component such as acrylic rubber particles is generally mixed and various techniques are proposed.

For example, there is disclosed an acrylic resin composition comprising (A) 20 to 98 parts by weight of a rigid thermoplastic acrylic resin obtained by polymerizing a monomer composed mainly of methyl methacrylate and (B) 2 to 80 parts by weight of polymer particles having a multi-layered structure, which is excellent in impact resistance (see, for example, Japanese Examined Patent Publication (Kokoku) No. 60-17406 and Japanese Examined Patent Publication (Kokoku) No. 60-30698). The polymer particles having a multi-layered structure has a three-layered structure comprising:

(I) a first layer formed of a rigid polymer obtained by emulsion polymerization of a monomer composed mainly of methyl methacrylate having Tg of 25° C. or higher, (II) a second layer formed by polymerizing a monomer mixture comprising 45 to 99.99% by weight of an alkyl acrylate having $C_{1-8}$ alkyl group, which has Tg of 25° C. or lower, 0.1 to 10% by weight of a polyfunctional grafting agent such as allyl (meth)acrylate, 5% by weight or less of a polyfunctional crosslinking agent such as dimethacrylate and 40% by weight or less of the other copolymerizable monomer, and (III) a third layer formed by polymerizing a monomer composed mainly of methyl methacrylate having Tg of 25° C. or higher in the presence of the second layer, the polymer particles having a particle diameter of 200 to 900 Å, wherein the first layer accounts for 5 to 30% by weight of the multi-layer structure, the second layer accounts for 40 to 85% by weight of the multi-layer structure, and the third layer accounts for 10 to 30% by weight of the multi-layer structure.

However, these acrylic resins could not reconcile high tensile strength and elongation characteristics.

A resin obtained by adding an acrylic polymer having an amino group to an acrylic polymer having a carboxyl group (see Japanese Unexamined Patent Publication (Kokai) No. 10-310754). This reference discloses an adhesive composition obtained by adding (2) 1 to 40% by weight of a resin composition having Tg of 40° C. or higher and a weight-average molecular weight of 100,000 or less obtained by copolymerizing one or more kinds of monomers selected from alkyl methacrylate having 1 to 20 carbon atoms, cycloalkyl methacrylate, benzyl methacrylate and styrene as a main component with 0.5 to 10% by weight of an amino group-containing monomer to (1) 100 parts by weight of a resin composition having a weight-average molecular weight of 80,000 or more obtained by copolymerizing an alkyl (meth)acrylate having 1 to 12 carbon atoms as a main component with 0.5 to 10% by weight of a carboxyl group-containing monomer. However, this composition is an adhesive and is insufficient in tensile strength when used as a film.

SUMMARY

The present invention has been made to solve the problems described above and an object thereof is to provide a film having high tensile strength and elongation characteristics, using an acrylic polymer which does not evolve a harmful gas during incineration. Although the film of the present invention is produced by mixing two or more kinds of polymers, a (meth)acrylic polymer having high glass transition point enables the resulting film to exhibit high tensile strength, while a (meth)acrylic polymer having low glass transition point improves elongation characteristics at low temperature of the film.

Since a carboxyl group and a tertiary amino group in the polymer form a firm acid-base ionic bond, miscibility between the polymers is improved, thereby enabling the resulting film to exhibit toughness.

Furthermore, the use of a (meth)acrylic polymer provides a film which exhibits excellent weatherability as compared with the film using a vinyl chloride resin.

To achieve the above-mentioned object, the present invention provides the followings.

(1) A (meth)acrylic film formed of:

(A) a carboxyl group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having a carboxyl group, and (B) an amino group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having an amino group, wherein a mixing ratio of the component (A) to the component (B) is from 10:90 to 90:10 in terms of a weight ratio.

(2) A (meth)acrylic film formed of:

(A) a carboxyl group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having a carboxyl group, and (B) an amino group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having an amino group, wherein a mixing ratio of the component (C) to the component (D) is from 10:90 to 90:10 in terms of a weight ratio.

(3) A (meth)acrylic film formed of:

a carboxyl group-containing (meth)acrylic polymer having a weight-average molecular weight of 10,000 or more obtained by copolymerizing a composition containing a monoethylenically unsaturated monomer as a main component and an unsaturated monomer having a carboxyl group, and an amino group-containing (meth)acrylic polymer having a weight-average molecular weight of 10,000 or more obtained by copolymerizing a composition containing a monoethylenically unsaturated monomer as a main component and an unsaturated monomer having an amino group, wherein a tensile strength at 25° C. defined in JIS K6251 is 5 MPa or more and an elongation is 25% or more.

(4) A (meth)acrylic film formed of:

(A) a carboxyl group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having a carboxyl group, (B) an amino group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having an amino group, and (C) a crosslinking agent containing functional groups which can react with said carboxyl group, wherein a mixing ratio of the component (A) to the component (B) is from 10:90 to 90:10 in terms of a weight ratio.

(5) A (meth)acrylic film formed of:

(A) a carboxyl group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having a carboxyl group, (B) an amino group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having an amino group, and (C) a crosslinking agent containing functional groups which can react with said carboxyl group, wherein a mixing ratio of the component (C) to the component (D) is from 10:90 to 90:10 in terms of a weight ratio.

(6) A (meth)acrylic film formed of:

a carboxyl group-containing (meth)acrylic polymer having a weight-average molecular weight of 10,000 or more obtained by copolymerizing a composition containing a monoethylenically unsaturated monomer as a main component and an unsaturated monomer having a carboxyl group, an amino group-containing (meth)acrylic polymer having a weight-average molecular weight of 10,000 or more obtained by copolymerizing a composition containing a monoethylenically unsaturated monomer as a main component and an unsaturated monomer having an amino group, and a crosslinking agent containing functional groups which can react with said carboxyl group, wherein a tensile strength at 25° C. defined in JIS K6251 is 5 MPa or more and an elongation is 25% or more.

(7) A marking film comprising:

the (meth)acrylic film comprising a surface as a colorant receiving surface and a back surface opposite to the surface according to any one of (1) to (6), a colorant received on the surface of the (meth)acrylic film, and an adhesive layer provided fixedly on the back surface of the (meth)acrylic film, which bonds the (meth)acrylic film to an adherend.

(8) A receptor sheet used to produce the marking film according to (7) by electrostatic toner printing, comprising the (meth)acrylic film according to any one of (1) to (6), and an adhesive layer provided fixedly on the back surface of the (meth)acrylic film.

The (meth)acrylic film of the present invention have both high tensile strength and elongation characteristics, which have never been achieved by a conventional acrylic film. The (meth)acrylic film exhibits excellent weatherability because it is made of a (meth)acrylic material. Furthermore, the (meth)acrylic film is useful as a substitute of a polyvinyl chloride resin which evolves a harmful gas during incineration because it is free from halogen.

DETAILED DESCRIPTION

Figure 1:
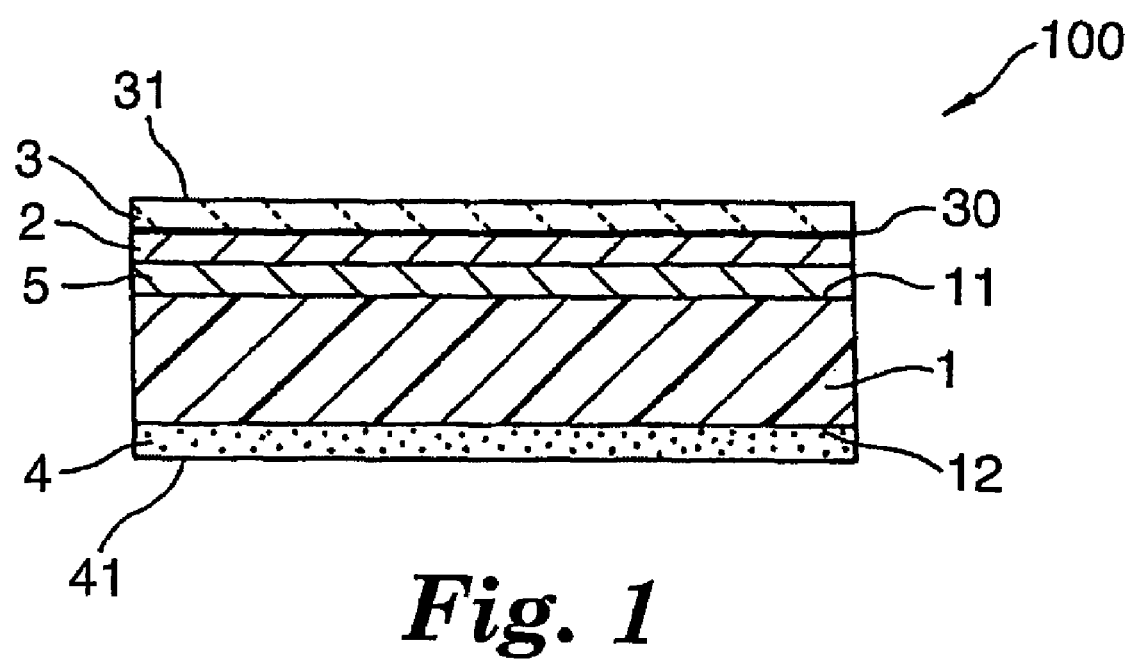
FIG. 1 is a cross-sectional view showing schematically a marking film of the present invention.

The (meth)acrylic film of the present invention is formed of a carboxyl group-containing (meth)acrylic polymer and an amino group-containing (meth)acrylic polymer. The term "(meth)acryl" as used herein means an acryl or methacryl. The carboxyl group-containing (meth)acrylic polymer is obtained by copolymerizing a monoethylenically unsaturated monomer with an unsaturated monomer having a carboxyl group. The amino group-containing (meth)acrylic polymer is obtained by copolymerizing a monoethylenically unsaturated monomer with an unsaturated monomer having an amino group.

The copolymerization is preferably carried out by radical polymerization. In this case, there can be used known polymerization methods such as solution polymerization, suspension polymerization, emulsion polymerization, and bulk polymerization. As an initiator, for example, there can be used peroxides such as benzoyl peroxide, lauroyl peroxide, and bis(4-tertiary butylcyclohexyl)peroxycarbonate; and azo polymerization initiators such as 2,2'-azobisisobutyronitrile, 2,2'-azobis-2-methylbutyronitrile, 4,4'-azobis-4-cyanovalerianic acid, 2,2'-azobis-(2-methylpropionic acid)dimethyl, and azobis (2,4-dimethylvaleronitrile) (AVN). The amount of the initiator is preferably from 0.05 to 5 parts by weight based on 100 parts by weight of a monomer mixture.

In the (meth)acrylic film of the present invention, in case Tg of the carboxyl group-containing (meth)acrylic polymer is controlled to a high temperature, preferably 0° C. or higher, Tg of the amino group-containing (meth)acrylic polymer is preferably controlled to the temperature lower than Tg of the carboxyl group-containing (meth)acrylic polymer (preferably 0° C. or lower). In case Tg of the former is controlled to high temperature (preferably 0° C. or lower), Tg of the latter is preferably controlled to low temperature (preferably 0° C. or higher). Because the (meth)acrylic polymer having high Tg enables the resulting film to exhibit high tensile strength, while the (meth)acrylic polymer having low Tg improves elongation characteristics at low temperature of the film.

The weight-average molecular weight of the polymer is usually 10,000 or more, preferably 50,000 or more, and more preferably 100,000 or more. The weight-average molecular weight means a molecular weight relative to polystyrene standards using a GPC method.

The monoethylenically unsaturated monomer constituting the (meth)acrylic polymer is used as a main component of the polymer and includes, for example, those represented by the general formula: $CH_2=CR_1COOR_2$ (wherein $R_1$ represents hydrogen or a methyl group, and $R_2$ represents a straight-chain or branched alkyl or phenyl group, an alkoxyalkyl group or a phenoxyalkyl group); aromatic vinyl monomers such as styrene, α-methylstyrene, and vinyltoluene; and vinyl esters such as vinyl acetate. Specific examples of the monomer include phenoxyalkyl (meth)acrylates such as methyl (meth)acrylate, ethyl (meth)acrylate, n-butyl (meth)acrylate, isoamyl (meth)acrylate, n-hexyl (meth)acrylate, 2-ethylhexyl (meth)acrylate, isooctyl (meth)acrylate, isononyl (meth) acrylate, decyl (meth)acrylate, dodecyl (meth)acrylate, and phenoxyethyl (meth)acrylate; and alkoxyalkyl (meth)acrylates such as methoxypropyl (meth)acrylate and 2-methoxybutyl (meth)acrylate. To obtain desired glass transition temperature, tensile strength and elongation characteristics, one or more kinds of these monomers are used according to the purposes thereof.

A (meth)acrylic polymer having Tg of 0° C. or higher can be obtained easily by copolymerizing a (meth)acrylic monomer having Tg of 0° C. or higher, for example, methyl methacrylate (MMA), n-butyl methacrylate (BMA) or the like as a main component.

A (meth)acrylic polymer having Tg of 0° C. or lower can be obtained easily by copolymerizing a component, a homopolymer obtained therefrom by homopolymerization having Tg of 0° C. or lower, for example, ethyl acrylate (EA), n-butyl acrylate (BA), 2-ethylhexyl acrylate (2EHA) or the like as a main component.

The glass transition temperature (Tg) of the carboxyl group-containing (meth)acrylic polymer and the amino group-containing (meth)acrylic polymer was determined by the FOX's equation (following equation):

$$1/Tg = X1/(Tg1+273.15) + X2/(Tg2+273.15) + \ldots + Xn/(Tgn+273.15)$$

where

Tg1 denotes a glass transition point of a homopolymer as a component 1,

Tg2 denotes a glass transition point of a homopolymer as a component 2,

X1 denotes a weight fraction of a monomer as a component 1 added during the polymerization, X2 denotes a weight fraction of a monomer as a component 2 added during the polymerization, and X1+X2+ . . . +Xn=1, on the assumption that the respective polymers are copolymerized from n kinds of monomers.

Examples of the unsaturated monomer having a carboxyl group, which is copolymerized with the monoethylenically unsaturated monomer to form a carboxyl group-containing (meth)acrylic polymer, include acrylic acid, methacrylic acid, maleic acid, itaconic acid, ω-carboxypolycaprolactone monoacrylate, monohydroxyethyl phthalate(meth)acrylate, β-carboxyethyl acrylate, 2-(meth)acryloyloxyethylsuccinic acid, and 2-(meth)acryloyloxyethylhexahydrophthalic acid.

The carboxyl group-containing (meth)acrylic polymer is preferably obtained by copolymerizing 80 to 95.5 parts by weight of the monoethylenically unsaturated monomer as a main component with 0.5 to 20 parts by weight of the unsaturated monomer having a carboxyl group.

Examples of the unsaturated monomer having an amino group, which is copolymerized with the monoethylenically unsaturated monomer to form an amino group-containing (meth)acrylic polymer, include dialkylaminoalkyl (meth) acrylates such as N,N-dimethylaminoethyl acrylate (DMAEA) and N,N-dimethylaminoethyl methacrylate (DMAEMA); dialkylaminoalkyl (meth)acrylamides such as N,N-dimethylaminopropylacrylamide (DMAPAA) and N,N-dimethylaminopropylmethacrylamide; and monomers having a tertiary amino group represented by vinyl monomer having a nitrogen-containing heterocycle such as vinylimidazole.

The amino group-containing (meth)acrylic polymer is preferably obtained by copolymerizing 80 to 95.5 parts by weight of the monoethylenically unsaturated monomer as a main component with 0.5 to 20 parts by weight of the unsaturated monomer having an amino group.

After the carboxyl group-containing (meth)acrylic polymer and the amino group-containing (meth)acrylic polymer were separately polymerized as described above, a (meth) acrylic film of the present invention can be formed by a conventional film forming method. Specifically, the film can be formed by mixing solutions of these polymers, applying the mixed solution on the release surface of a liner, and solidifying the solution with drying. As a coating device, there can be used conventional coaters such as bar coater, knife coater, roll coater, and die coater. The solidifying operation is the same as the operation of cooling the molten resin component. Also this film can be formed by a melt extrusion molding method.

A film having desired tensile strength and elongation characteristics can be obtained by changing a mixing ratio of the carboxyl group-containing (meth)acrylic polymer to the amino group-containing (meth)acrylic polymer in the formation of the film. Specifically, a mixing ratio of a polymer having high Tg to a polymer having low Tg among the carboxyl group-containing (meth)acrylic polymer and the amino group-containing (meth)acrylic polymer is preferably within a range from 10:90 to 90:10, more preferably from 20:80 to 90:10, and most preferably from 30:70 to 90:10. It is preferable to increase the amount of the polymer having high Tg.

It is preferable to crosslink the carboxyl group-containing (meth)acrylic polymer and the amino group-containing (meth)acrylic polymer in the formation of the film. By crosslinking them, networks are formed, and then it contributes to improve low temperature flexibility. As a crosslinker, a crosslinking agent containing functional groups that can react with carboxylic groups is used. Specifically, bisamide (for example, RD1054 made by 3M), azirizine (for example, Chemitite PZ33 made by Nihon Shokubai, NeoCryl CX-100 made by Avecia), carbodiimide (for example, Carbodilite V-03, V-05, V-07 made by Nisshinbo), epoxy (for example, E-AX, E-5XM, E5C made by Soken Chemical & Engineering) are used. An amount of the crosslinking agent is from 0.1 to 5 parts by weight for 100 parts by weight of the carboxyl group-containing (meth)acrylic polymer.

In the (meth)acrylic film of the present invention, the tensile strength is preferably 3 MPa or more, more preferably 15 MPa or more, and most preferably 30 MPa or more. When the tensile strength is less than 3 MPa, there arises a problem that the resulting film is likely to be broken when applied on the adherend. In the (meth)acrylic film of the present invention, the elongation is preferably 25% or more, more preferably 50% or more, and most preferably 75% or more. When the elongation is less than 25%, there arises a problem that the resulting film is likely to be broken when applied on the adherend.

The tensile strength and elongation are measured under the following conditions in accordance with the method defined in JIS K6251.

Shape of sample to be measured: "dumbbell shaped No. 3 test piece" defined in JIS K6251
Testing speed: 300 mm/min
Measuring temperature: 5° C. and 25° C.

The measured results were summarized as follows.

Tensile Strength T (unit: MPa)

After measuring a maximum tensile force F (unit: N) up to breakage of a test piece and a cross section A (unit: mm$^2$) of the test piece, the tensile strength was determined by the following equation.

$$T=F/A$$

Elongation E (unit: %)

After measuring a distance between marked lines L1 (unit: mm) upon breakage and a distance between marked lines L0 (25 mm) of a test piece, the elongation was determined by the following equation.

$$E=(L1-L0)/L0\times 100$$

The thickness of the (meth)acrylic film of the present invention is not specifically limited and can be controlled to the same thickness as that of a conventional decorative sheet. Specifically, the thickness is generally within a range from 1 to 1000 μm, preferably from 5 to 500 μm, and more preferably from 20 to 150 μm, although it varies depending on the purposes. When the thickness is too large, the mechanical strength decreases and the resulting film is likely to be broken when the film is peeled after bonding to the adherend. On the other hand, when the thickness is too large, the flexibility of the film is likely to be deteriorated.

The (meth)acrylic film of the present invention is excellent in weatherability as compared with a commercially available vinyl chloride film, and also the surface gloss retention and color difference after an accelerated aging test are the same as or better than those of the vinyl chloride film.

The surface gloss retention and color difference are measured according to the following procedure.

First, an acrylic adhesive of an isooctyl acrylate-methyl acrylate-acrylic acid copolymer in a ratio of 70:22.5:7.5 (weight ratio) (solvent: ethyl acetate, weight-average molecular weight: 360,000, Tg: −7° C.) was prepared. An adhesive composition was prepared by mixing 100 parts by weight of the acrylic adhesive with 1.7 parts by weight (solid content ratio) of a bisamide crosslinking agent, applied on a release paper comprising a paper base and a polyethylene laminate formed on both surfaces of the paper base using a knife coater so that the resulting film has a thickness of 30 μm after drying, and then dried and crosslinked with heating at 90° C. for 5 minutes. Then, a film to be measured such as (meth)acrylic film was laminated thereon to obtain a test piece. After test piece was applied on a 1 mm thick aluminum plate (A5082P) and allowed to stand for 200 hours in a weatherometer (KU-R5C1-A) manufactured by DAIPLA WINTES CO., LTD., the surface gloss retention and color difference were measured. The test piece was irradiated with light at a dose of 60 mW/cm$^2$ while repeating a cycle of lighting at a temperature of 60° C. and a humidity of 50% for 4 hours and lights-out at a temperature of 40° C. and a humidity of 98% for 4 hours.

Using a portable gloss meter (GMX-202, manufactured by MURAKAMI COLOR RESEARCH LABORATORY), 60° surface gloss was measured. The surface gloss retention was calculated by the following equation.

[Surface gloss retention (%)]={[Surface gloss after irradiation]−[Surface gloss before irradiation]}× 100

Using a color meter (Σ90, manufactured by NIPPON DENSHOKU Co., Ltd.), L*, a* and b* were measured. The color difference was calculated by the following equation:

[Color difference]=$[(L_2^*-L_1^*)^2+(a_2^*-a_1^*)^2+(b_2^*-B_1^*)^2]^{1/2}$ where $L_1^*$, $a_1^*$ and $b_1^*$ are measured values before irradiation, and $L_2^*$, $a_2^*$ and $b_2^*$ are measured values after irradiation.

To the film, hiding pigments can be added when hiding properties are required. If necessary, one or more conventionally known additives such as antioxidants, ultraviolet absorbers, photostabilizers, plasticizers, lubricants, antistatic agents, flame retardants, and fillers may be added according to the purposes of the film.

Marking Film

Preferred example of the marking film of the present invention will be described with reference to FIG. 1. FIG. 1 is a cross-sectional view showing schematically the marking film of the present invention. A (meth)acrylic film (1) in a marking film (100) has a surface (11) and a back surface (12) and receives a colorant received on the surface (11), namely, a toner (2). In order to prevent the toner from falling off, a protective film (3) can be provided on the surface of the film. In this case, the toner (2) forms a visible image from the outermost surface (31) of the protective film (3) through the protective film (3). Also adhesion between the toner (2) and the (meth)acrylic film (1) can be enhanced by providing a receptor layer (5) on the surface (11) of the (meth)acrylic film (1).

On the back surface (12) of the meth)acrylic film (1), an adhesive layer (4) is fixedly provided. The adhesive layer usually forms a flat adhesive surface, but it may have an uneven adhesive surface. On the uneven adhesive surface (41) of the adhesive layer (4), a protruding portion (not shown) and a recessed portion (not shown) surrounding the protruding portion are formed. The unevenness of the adhesive surface is designed to include grooves capable of forming a communicating passage to the edge of the adhesive sheet when the adhesive sheet is bonded to an adherend.

As the (meth)acrylic film (1), the above-mentioned the (meth)acrylic film is used. The colorant is usually a toner or ink. The toner comprises a binder resin and a pigment dispersed in the binder resin. The binder resin is composed of a mixture of one or more kinds selected from the group consisting of vinyl chloride-vinyl acetate copolymer, an acrylic resin and polyester resin.

The entire protective film (3) has light transmission properties. A light transmission is usually 60% or more, preferably 70% or more, and particularly preferably 80% or more. The term "light transmission" as used herein means an entire light transmission as measured by a spectrophotometer or, a color meter which also serves as a photometer, using light having a wavelength of 550 nm.

The protective film (3) is preferably made of a resin film containing high transparency. The resin of the resin film includes, for example, fluororesin, phthalate polyester (e.g. PET and PEN), acrylic resin, and petroleum-resistant resin. The fluororesin is a polymer obtained by polymerizing the fluorine monomer. The fluorine monomer includes, for example, fluorine ethylene monomers such as vinylidene fluoride, propylene hexafluorine, ethylene tetrafluoride, and ethylene chloride trifluoride. It is possible to mix one or more kinds of copolymerizable monomers selected from methacrylates such as methyl methacrylate, ethyl methacrylate, propyl methacrylate, and butyl methacrylate; and acrylates such as methyl acrylate, ethyl acrylate, propyl acrylate, and butyl acrylate, in addition to the fluorine monomer. Also a protective film may be made of a resin composition obtained by blending the fluorine resin with the acrylic resin. The thickness of the protective film is usually within a range from 5 to 120 µm, and preferably from 10 to 100 µm.

An adhesive layer for protective film (30) is usually used to bond the protective film (3) to the (meth)acrylic film (1). The adhesive of the adhesive layer for protective film (30) is not specifically limited, but is usually a pressure-sensitive adhesive containing an adhesive polymer by the following reason. That is, the pressure-sensitive adhesive satisfactorily conforms to the unevenness formed by the toner (2) in the surface (11) of the (meth)acrylic film, thereby making it possible to make the protective film (3) and the (meth)acrylic film (1) come closely into contact with each other without leaving bubbles therebetween. It is preferable so as not to leave bubbles because bubbles impair the visibility. The thickness of the adhesive layer for protective film (30) is usually within a range from 20 to 100 µm, and preferably from 25 to 80 µm.

The resin constituting the receptor layer (5) is not specifically limited and there can be used acrylic polymer, polyolefin, polyvinyl acetal and phenoxy resin. The glass transition temperature of the resin constituting the receptor layer is usually within a range from 0 to 100° C. When the glass transition temperature of the receptor layer is too high, the toner transferrability is lowered and a clear image may not be obtained. Furthermore, when the glass transition temperature of the receptor layer is too high, the flexibility of the entire marking film may be lowered. The glass transition temperature of the receptor layer is preferably adjusted to 0° C. or higher in order to effectively lower tack at normal temperature of the surface of receiving the colorant. Consequently, it is made possible to effectively prevent sticking of marking film precursors and receptor sheets before coating with the protective film. Therefore, after stored in the form of a roll, the roll can be used easily while unwinding. The thickness of the receptor layer is usually within a range from 20 to 50 µm, and preferably from 5 to 40 µm.

The adhesive of the adhesive layer (4) is not specifically limited and is usually a pressure-sensitive adhesive containing an adhesive polymer. As the pressure-sensitive adhesive layer, for example, a single-layered pressure-sensitive adhesive film containing an adhesive polymer and a double-coated adhesive sheet comprising two pressure-sensitive layers are preferably used.

The adhesive layer (4) can be made of a coating film of an adhesive containing an adhesive polymer. Preferable adhesive comprises an adhesive polymer and a crosslinking agent containing the adhesive polymer. The term "adhesive polymer" used herein refers to a polymer which exhibits adhesion at normal temperature (about 25° C.). As the adhesive polymer, for example, acrylic polymer, polyurethane, polyolefin and polyester can be used.

An example of the synthesis of the adhesive polymer will be explained by way of an acrylic polymer. First, a polar (meth)acrylic monomer such as acrylic unsaturated acid (for example, acrylic acid, methacrylic acid, itaconic acid, or maleic acid) or acrylonitrile is prepared as a first monomer. The first monomer is mixed with an acrylic monomer as a second monomer to prepare a monomer mixture. As the second monomer, there can be used alkyl acrylates, for example, isooctyl acrylate, butyl acrylate, 2-methylbutyl acrylate, 2-ethylhexyl acrylate, and isononyl acrylate. Using a solution polymerization, emulsion polymerization or bulk polymerization method, an adhesive polymer having a predetermined molecular weight is synthesized from the mixture thus prepared.

When using a crosslinking agent in case of crosslinking the adhesive polymer, the amount of the crosslinking agent varies depending on the kind of the crosslinking agent, but is usually within a range from 0.02 to 2 parts by weight, and preferably from 0.03 to 1 parts by weight, based on 100 parts by weight of the adhesive polymer. As the crosslinking agent, for example, there can be used isocyanate compound, melamine compound, poly(meth)acrylate compound, epoxy compound, and amide compound, bisamide compound [bisaziridine derivative of dibasic acid such as isophthaloylbis(2-methylaziridine)].

The glass transition temperature (Tg) of the adhesive layer is preferably within a range from −50 to 0° C., and more preferably from −45 to −5° C. When Tg of the adhesive layer is too high, adhesion between the adherend and the marking film is likely to be lowered. On the other hand, when Tg of the adhesive layer is too low, when the marking film is stored in the form of a roll, the adhesive oozes from the side portion of the roll and sticking of mutually contacted marking films may not be prevented. Tg is a value determined from Tan δ measured by using a dynamic viscoelasticity measuring device (Rheometrics Scientific Inc. RDA-II). The measurement was carried out under the conditions of a shear rate of 1 radian/sec (torsion mode), a heating range from −60 to 100° C. and a heating rate of 5° C./sec. The thickness of the specimen is usually from 1 to 2 mm.

The thickness of the protective film is usually within a range from 5 to 200 µm, preferably from 20 to 100 µm, and more preferably from 25 to 80 µm. As far as the effect of the present invention is not impaired, there can be added additives such as tackifiers, elastic microspheres, adhesive polymer microspheres, crystalline polymers, inorganic powders, and ultraviolet absorbers.

The adhesive layer (4) usually has a flat adhesive surface, but may have an uneven adhesive surface as described above. An example of a method of forming the uneven adhesive surface will be described.

First, a liner having a release surface of a predetermined uneven structure is prepared. A coating composition containing an adhesive polymer (adhesive coating composition for forming an adhesive layer of an adhesive sheet) is applied on the release surface of the liner, and then dried to form an adhesive layer. Consequently, a negative structure of the uneven surface of the liner is imparted to the surface of the adhesive layer in contact with the liner. This adhesive surface subsequently serves as the adhesive surface of the adhesive sheet to form an uneven adhesive surface having a predetermined structure (positive structure) on the adhesive surface. The unevenness of the adhesive surface is designed to include grooves capable of forming a communicating passage to the edge of the adhesive sheet when the adhesive sheet is bonded to an adherend, as described above.

As far as it is possible to prevent bubbles from being trapped during application of the marking film, grooves in the surface of the adhesive layer having a regular or irregular shape may be disposed on the adhesive layer in a regular or irregular pattern to provide grooves having a regular pattern When a plurality of grooves is formed wherein the grooves are generally parallel with each other, the distance between the grooves is preferably from 10 to 2,000 μm. The depth of the grooves (the distance between the adhesive surface and the bottom of the groove measured in the direction of the thickness of the receptor film) is usually from 10 to 100 μm. Also the shape of the groove is not specifically limited so long as the effect of the present invention is not impaired. For example, the groove may have a generally rectangular, trapezoidal, semicircular or semielliptical cross section in a direction perpendicular to the adhesive surface. Alternatively, the groove may have a cross section that is irregular.

A marking film (100) can be produced in the following manner. First, the above-mentioned (meth)acrylic film (1) is prepared. In case the marking film (100) includes a receptor layer (5), the receptor layer is formed on the liner and the (meth)acrylic film is then formed on the receptor layer with the liner. In this case, as far as the effect of the present invention is not impaired, the other layer, for example, a primer layer or an adhesive layer may be provided between the (meth)acrylic film (1) and the receptor layer (5).

Then, an adhesive layer (4) is made to come closely into contact with the back surface of the (meth)acrylic film (1). A coating solution containing an adhesive is applied on the release surface of the liner and dried to form an adhesive layer with the liner, and then the adhesive layer wit the liner is laminated on the back surface of the (meth)acrylic film (1), thereby making the adhesive layer come closely into contact with the back surface of the (meth)acrylic film.

Then, an image is formed on the surface of the (meth) acrylic film (1) by the toner (2) and a protective film (3) is optionally provided thereon, thereby making it possible to complete the marking film (100) of the present invention. In case an image is formed by transferring the toner (2) onto the surface of the (meth)acrylic film (1), the image is formed by transferring the toner using a conventional printing method. In case of using an electrostatic printing method, an image is temporarily formed on a temporary carrier referred to as a transfer media and the image is then transferred onto the surface of the (meth)acrylic film (1) by heating under pressure.

The thickness of the marking film is usually within a range from 30 to 1500 μm preferably from 50 to 950 μm. When the thickness is too small, the mechanical strength decreases and the marking film is likely to be broken when peeled again after bonding to the adherend. On the other hand, when the thickness is too large, the flexibility of the marking film is likely to be lowered.

Receptor Sheet

The receptor sheet of the present invention is a film with an adhesive layer, which comprises the (meth)acrylic film to which colorants such as toner are applied, and an adhesive layer which bonds the (meth)acrylic film to an adherend. That is, the receptor sheet does not include the toner (2) and the protective film (3) and is composed of the (meth)acrylic film (1) and the adhesive layer (4). Therefore, the (meth)acrylic film and the adhesive layer can have the same constitution as that of the marking film, and also the same formation methods can be used.

The total thickness of the receptor sheet is usually within a range from 5 to 1200 μm, and preferably from 25 to 700 μm. When the thickness is too small, the mechanical strength decreases and the receptor sheet is likely to be broken when the marking film is peeled again after bonding to the adherend. On the other hand, when the thickness is too large, the flexibility of the marking film including the receptor sheet is likely to be deteriorated.

EXAMPLE 1

The (meth)acrylic film of the present invention was produced according to the following procedure.

First, 94 parts by weight of methyl methacrylate (MMA) and 6 parts by weight of dimethylaminoethyl methacrylate (DMAEMA) were dissolved in 150 parts by weight of methyl ethyl ketone (MEK) and, after adding 0.5 parts by weight of azobis(2,4-dimethylvaleronitrile) (AVN) as a polymerization initiator, the mixture was reacted in a nitrogen atmosphere at 50° C. for 20 hours to obtain a MEK solution of an amino group-containing (meth)acrylic polymer. The resulting amino group-containing (meth)acrylic polymer had a weight-average molecular weight of 120,000 and Tg of 98° C.

Then, a MEK solution of a carboxyl group-containing (meth)acrylic polymer was prepared in the same manner as described above, except that 94 parts by weight of n-butyl acrylate (BA) and 6 parts by weight of acrylic acid (AA) were used. The resulting carboxyl group-containing (meth)acrylic polymer had a weight-average molecular weight of 260,000 and Tg of −49° C.

After mixing with stirring so as to adjust the solid content ratio of the amine group-containing (meth)acrylic polymer solution to the carboxyl group-containing (meth)acrylic polymer solution to 80:20, the resulting solution was applied on a 38 μm released polyester carrier film (manufactured by TEIJIN LIMITED under the trade name of Purex™ A-71) by using knife coater so that the resulting film has a thickness of 50 μm after drying, and then dried at 100° C. for 20 minutes to obtain a (meth)acrylic film.

The resulting film was subjected to a tensile test under the conditions of a temperature of 5° C. and 25° C. and a testing speed of 300 mm/min in accordance with the method defined in JIS K6251. The results are shown in Table 1.

EXAMPLE 2

In the same manner as in Example 1, except for mixing so as to adjust the solid content ratio of the amine group-containing (meth)acrylic polymer solution to the carboxyl group-containing (meth)acrylic polymer solution to 70:30, a (meth) acrylic film was obtained.

The resulting film was subjected to the tensile test in the same manner. The results are shown in Table 1.

With respect to the film, the surface gloss retention (%) and color difference were measured. The results are shown in Table 2.

EXAMPLE 3

In the same manner as in Example 1, except for mixing so as to adjust the solid content ratio of the amine group-containing (meth)acrylic polymer solution to the carboxyl group-containing (meth)acrylic polymer solution to 60:40, a (meth) acrylic film was obtained.

The resulting film was subjected to the tensile test in the same manner. The results are shown in Table 1.

EXAMPLE 4

In the same manner as in Example 1, except for mixing so as to adjust the solid content ratio of the amine group-containing (meth)acrylic polymer solution to the carboxyl group-containing (meth)acrylic polymer solution to 50:50, a (meth)acrylic film was obtained.

The resulting film was subjected to the tensile test in the same manner. The results are shown in Table 1.

With respect to the film, the surface gloss retention (%) and color difference were measured in the same manner as described above. The results are shown in Table 2.

EXAMPLE 5

In the same manner as in Example 1, except for mixing so as to adjust the solid content ratio of the amine group-containing (meth)acrylic polymer solution to the carboxyl group-containing (meth)acrylic polymer solution to 40:60, a (meth)acrylic film was obtained.

The resulting film was subjected to the tensile test in the same manner. The results are shown in Table 1.

With respect to the film, the surface gloss retention (%) and color difference were measured in the same manner as described above. The results are shown in Table 2.

EXAMPLE 6

In the same manner as in Example 1, a MEK solution of an amino group-containing (meth)acrylic polymer was prepared. Then, in the same manner as described above, except that 94 parts by weight of ethyl acrylate (EA) and 6 parts by weight of acrylic acid (AA) were used as the monomer, a MEK solution of a carboxyl group-containing (meth)acrylic polymer was prepared. The resulting carboxyl group-containing (meth)acrylic polymer had a weight-average molecular weight of 260,000 and Tg of −17° C.

After mixing with stirring so as to adjust the solid content ratio of the amine group-containing (meth)acrylic polymer solution to the carboxyl group-containing (meth)acrylic polymer solution to 55:45 (weight ratio), a (meth)acrylic film was obtained in the same manner as in Example 1.

The resulting film was subjected to the tensile test in the same manner. The results are shown in Table 1.

EXAMPLE 7

In the same manner as in Example 1, a MEK solution of an amino group-containing (meth)acrylic polymer was prepared.

Then, in the same manner as in Example 1, except that 90 parts by weight of 2-ethylhexyl acrylate (2-EHA) and 10 parts by weight of acrylic acid (AA) were used as the monomer, a MEK solution of a carboxyl group-containing (meth)acrylic polymer was prepared. The resulting carboxyl group-containing (meth)acrylic polymer had a weight-average molecular weight of 450,000 and Tg of −60° C.

After mixing with stirring so as to adjust the solid content ratio of the amine group-containing (meth)acrylic polymer solution to the carboxyl group-containing (meth)acrylic polymer solution to 65:35 (weight ratio), a (meth)acrylic film was obtained in the same manner as in Example 1.

The resulting film was subjected to the tensile test in the same manner. The results are shown in Table 1.

EXAMPLE 8

In the same manner as in Example 1, except that 64 parts by weight of methyl methacrylate (MMA), 30 parts by weight of n-butyl acrylate (BA) and 6 parts by weight of dimethylaminoethyl methacrylate (DMAEMA) were used as the monomer, a MEK solution of an amino group-containing (meth)acrylic polymer was prepared. The resulting amino group-containing (meth)acrylic polymer had a weight-average molecular weight of 260,000 and Tg of 32° C.

In the same manner as in Example 1, a MEK solution of a carboxyl group-containing (meth)acrylic polymer was prepared. After mixing with stirring so as to adjust a solid content ratio of the amine group-containing (meth)acrylic polymer solution to the carboxyl group-containing (meth)acrylic polymer solution to 80:20 (weight ratio), a (meth)acrylic film was obtained in the same manner as in Example 1.

The resulting film was subjected to the tensile test in the same manner. The results are shown in Table 1.

EXAMPLE 9

In the same manner as in Example 8, except for mixing with stirring so as to adjust the solid content ratio of the amine group-containing (meth)acrylic polymer solution to the carboxyl group-containing (meth)acrylic polymer solution to 65:35, a (meth)acrylic film was obtained.

The resulting film was subjected to the tensile test in the same manner. The results are shown in Table 1.

EXAMPLE 10

First, 95 parts by weight of methyl methacrylate (MMA) and 5 parts by weight of methacrylic acid (MAA) were dissolved in 150 parts by weight of methyl ethyl ketone (MEK) and, after adding 0.5 parts by weight of azobis(2,4-dimethylvaleronitrile) (AVN) as a polymerization initiator, the mixture was reacted in a nitrogen atmosphere at 50° C. for 20 hours to obtain a MEK solution of a carboxyl group-containing (meth)acrylic polymer. The resulting carboxyl group-containing (meth)acrylic polymer had a weight-average molecular weight of 160,000 and Tg of 110° C.

Then, a MEK solution of an amino group-containing (meth)acrylic polymer was prepared in the same manner as described above, except that 90 parts by weight of n-butyl acrylate (BA) and 10 parts by weight of dimethylaminoethyl acrylate (DMAEA) were used as the monomer. The resulting amino group-containing (meth)acrylic polymer had a weight-average molecular weight of 160,000 and Tg of −50° C.

In the same manner as in Example 1, except for mixing with stirring so as to adjust solid content ratio of the carboxyl group-containing (meth)acrylic polymer solution to the amino group-containing (meth)acrylic polymer solution to 55:45, a (meth)acrylic film was obtained.

The resulting film was subjected to the tensile test in the same manner as in Example 1. The results are shown in Table 1.

EXAMPLE 11

In the same manner as in Example 10, a MEK solution of a carboxyl group-containing (meth)acrylic polymer was prepared. Then, in the same manner as described above, except that 94 parts by weight of n-butyl acrylate (BA) and 6 parts by weight of dimethylaminopropylacrylamide (DMAPAA) were used as the monomer, a MEK solution of an amino group-containing (meth)acrylic polymer was prepared. The resulting amino group-containing (meth)acrylic polymer had a weight-average molecular weight of 210,000 and Tg of −49° C.

In the same manner as in Example 1, except for mixing with stirring so as to adjust the solid content ratio of the carboxyl group-containing (meth)acrylic polymer solution to the amino group-containing (meth)acrylic polymer solution to 50:50, a (meth)acrylic film was obtained.

The resulting film was subjected to the tensile test in the same manner as in Example 1. The results are shown in Table 1.

EXAMPLE 12

In the same manner as in Example 11, except that 55 parts by weight of methyl methacrylate (MMA), 40 parts by weight of n-butyl acrylate (BMA) and 5 parts by weight of methacrylic acid (MAA) were used as the monomer, a MEK solution of a carboxyl group-containing (meth)acrylic polymer was prepared. The resulting carboxyl group-containing (meth)acrylic polymer had a weight-average molecular weight of 170,000 and Tg of 69° C.

In the same manner as in Example 11, a MEK solution of an amino group-containing (meth)acrylic polymer was prepared. After mixing with stirring so as to adjust the solid content ratio of the carboxyl group-containing (meth)acrylic polymer solution to the amino group-containing (meth) acrylic polymer solution to 75:25, a (meth)acrylic film was obtained in the same manner as in Example 1.

The resulting film was subjected to the tensile test in the same manner as in Example 1. The results are shown in Table 1.

EXAMPLE 13

In the same manner as in Example 1, except that 95 parts by weight of n-butyl methacrylate (BMA) and 5 parts by weight of methacrylic acid (MAA) were used as the monomer, a MEK solution of a carboxyl group-containing (meth)acrylic polymer was prepared. The resulting carboxyl group-containing (meth)acrylic polymer had a weight-average molecular weight of 170,000 and Tg of 26° C.

In the same manner as described above, except that 92.5 parts by weight of n-butyl acrylate (BA) and 7.5 parts by weight of 1-vinylimidazole (Vim) were used as the monomer, a MEK solution of an amino group-containing (meth)acrylic polymer was prepared. The resulting amino group-containing (meth)acrylic polymer had a weight-average molecular weight of 270,000 and Tg of −45° C.

After mixing with stirring so as to adjust the solid content ratio of the carboxyl group-containing (meth)acrylic polymer solution to the amino group-containing (meth)acrylic polymer solution to 80:20, a (meth)acrylic film was obtained in the same manner as in Example 1.

The resulting film was subjected to the tensile test in the same manner as in Example 1. The results are shown in Table 1.

EXAMPLE 14

In the same manner as in Example 1, except that 79 parts by weight of methyl methacrylate (MMA), 15 parts by weight of n-butyl acrylate (BA) and 6 parts by weight of dimethylaminoethyl methacrylate (DMAEMA) were used as the monomer, a MEK solution of an amino group-containing (meth) acrylic polymer was prepared. The resulting amino group-containing (meth)acrylic polymer had a weight-average molecular weight of 75,000 and Tg of 63° C.

After mixing with stirring 100 parts by weight of the amine group-containing (meth)acrylic polymer solution, 90 parts by weight of the carboxyl group-containing (meth)acrylic polymer solution prepared by the same manner as in Example 1, and 0.5 parts by weight of a crosslinking agent A (bisamide, RD1054 made by 3M) par 100 parts by weight of the carboxyl group-containing (meth)acrylic polymer, a (meth)acrylic film was obtained in the same manner as in Example 1.

The resulting film was subjected to the tensile test in the same manner. The results are shown in Table 1.

With respect to the film, the surface gloss retention (%) and color difference were measured in the same manner as described above. The results are shown in Table 2.

Then, A polymer was prepared from 70 parts by weight of isooctyl acrylate, 22.5 parts by weight of methyl acrylate and 7.5 parts by weight of acrylic acid. The resulting polymer had a weight-average molecular weight of 36,000 and Tg of −7° C. The MEK solution of this polymer and bisamide crosslinking agent were mixed at solid ratio of 100:1.7 to prepare an adhesive composition. The adhesive composition was coated on a both sided polyethylene laminated release liner by using a knife coater so that the resulting film has a thickness of 30 μm after drying, and then dried at 90° C. for 5 minutes to dry and crosslink the adhesive layer. Then, said adhesive layer and said acrylic film were laminated to obtain a marking film.

A heat-transferable digital image was made by Scotchprint 9512 electrostatic printer system (made by 3M) on Trident transfer media (made by 3M). Next, by using Orca III heat laminator (made by 3M), said digital image was heat-transferred on said receptor layer. Operation condition of Orca m was upper roll temperature of 135° C., lower roll temperature of 50° C., operation speed of 70 cm/min. and rolls nip pressure of 60 psi. Paper carrier of Trident was eliminated. It was made sure that toner image was perfectly transferred. As a test of ply-adhesion between toner and receptor, 100 checkers were cut on toner surface, #610 tape made by 3M was laminated with said checkers, and then the tape was quickly stripped. Transfer of checkers was not found on the #610 tape. It was made sure that a ply-adhesion between toner and receptor was good.

EXAMPLE 15

In the same manner as in Example 14, a solution of a (meth)acrylic polymer was prepared. After mixing with stirring 100 parts by weight of the (meth)acrylic polymer solution, 90 parts by weight of the carboxyl group-containing (meth)acrylic polymer solution, and 0.5 parts by weight of a crosslinking agent B (carbodiimide, Carbodilite V-07 made by Nisshinbo, toluene solution, NCO %=0.01%, carbodiimide (NCN) equivalent weight of 200) par 100 parts by weight of the carboxyl group-containing (meth)acrylic polymer, a (meth)acrylic film was obtained in the same manner as in Example 1.

The resulting film was subjected to the tensile test in the same manner. The results are shown in Table 1.

With respect to the film, the surface gloss retention (%) and color difference were measured in the same manner as described above. The results are shown in Table 2.

An adhesive composition as Example 14 and said acrylic film were laminated to obtain marking film. A heat-transferable digital image test was carried out in the same manner as in Example 14. It was made sure that toner image was perfectly transferred. For #610 tape snap test, a transfer of check-

EXAMPLE 17

In the same manner as in Example 14, a solution of a (meth)acrylic polymer was prepared. After mixing with stirring 100 parts by weight of the (meth)acrylic polymer solution, 90 parts by weight of the carboxyl group-containing (meth)acrylic polymer solution, and 1.0 parts by weight of a crosslinking agent C (Chemitite PZ33 made by Nihon Shokubai (2,2'-bishydroxymethylbutanol-tris[3-(1-aziridinyl)propionate]), molecular weight of 425) par 100 parts by weight of the carboxyl group-containing (meth)acrylic polymer, a (meth)acrylic film was obtained in the same manner as in Example 1.

The resulting film was subjected to the tensile test in the same manner. The results are shown in Table 1.

With respect to the film, the surface gloss retention (%) and color difference were measured in the same manner as described above. The results are shown in Table 2.

An adhesive composition as Example 14 and said acrylic film were laminated to obtain marking film. A heat-transferable digital image test was carried out in the same manner as in Example 14. It was made sure that toner image was perfectly transferred. For #610 tape snap test, a transfer of checkers was not found. It was made sure that a ply-adhesion between toner and receptor was good.

EXAMPLE 17

In the same manner as in Example 14, a solution of a (meth)acrylic polymer was prepared. After mixing with stirring 100 parts by weight of the (meth)acrylic polymer solution, 90 parts by weight of the carboxyl group-containing (meth)acrylic polymer solution, and 1.0 parts by weight of a crosslinking agent D (E-AX made by Soken Chemical & Engineering, epoxy crosslinking agent) par 100 parts by weight of the carboxyl group-containing (meth)acrylic polymer, a (meth)acrylic film was obtained in the same manner as in Example 1.

The resulting film was subjected to the tensile test in the same manner. The results are shown in Table 1.

With respect to the film, the surface gloss retention (%) and color difference were measured in the same manner as described above. The results are shown in Table 2.

An adhesive composition as Example 14 and said acrylic film were laminated to obtain marking film. A heat-transferable digital image test was carried out in the same manner as in Example 14. It was made sure that toner image was perfectly transferred. For #610 tape snap test, a transfer of checkers was not found. It was made sure that a ply-adhesion between toner and receptor was good.

EXAMPLE 18

In the same manner as in Example 1, except that 77 parts by weight of methyl methacrylate (MMA), 15 parts by weight of n-butyl acrylate (BA), 6 parts by weight of dimethylaminoethyl methacrylate (DMAEMA), and 2 parts by weight of acrylic acid (AA) were used as the monomer, a MEK solution of an amino group-containing (meth)acrylic polymer was prepared. The resulting amino group-containing (meth)acrylic polymer had a weight-average molecular weight of 75,000 and Tg of 63° C.

After mixing with stirring 100 parts by weight of the amine group-containing (meth)acrylic polymer solution, 90 parts by weight of the carboxyl group-containing (meth)acrylic polymer solution prepared by the same manner as in Example 1, a (meth)acrylic film was obtained in the same manner as in Example 1.

The resulting film was subjected to the tensile test in the same manner. The results are shown in Table 1.

With respect to the film, the surface gloss retention (%) and color difference were measured in the same manner as described above. The results are shown in Table 2.

An adhesive composition as Example 14 and said acrylic film were laminated to obtain marking film. A heat-transferable digital image test was carried out in the same manner as in Example 14. It was made sure that toner image was perfectly transferred. For #610 tape snap test, a transfer of checkers was not found. It was made sure that a ply-adhesion between toner and receptor was good.

EXAMPLE 19

In the same manner as in Example 18, a solution of a (meth)acrylic polymer was prepared. After mixing with stirring 100 parts by weight of the (meth)acrylic polymer solution, 90 parts by weight of the carboxyl group-containing (meth)acrylic polymer solution, and 0.5 parts by weight of a crosslinking agent A par 100 parts by weight of the carboxyl group-containing (meth)acrylic polymer, a (meth)acrylic film was obtained in the same manner as in Example 1.

The resulting film was subjected to the tensile test in the same manner. The results are shown in Table 1.

With respect to the film, the surface gloss retention (%) and color difference were measured in the same manner as described above. The results are shown in Table 2.

An adhesive composition as Example 14 and said acrylic film were laminated to obtain marking film. A heat-transferable digital image test was carried out in the same manner as in Example 14. It was made sure that toner image was perfectly transferred. For #610 tape snap test, a transfer of checkers was not found. It was made sure that a ply-adhesion between toner and receptor was good.

COMPARATIVE EXAMPLE 1

A film made of a mixture of amino group-containing (meth)acrylic polymers was produced according to the following procedure.

First, a MEK solution of an amino group-containing (meth)acrylic polymers was prepared in the same manner as in Example 1. Then, a MEK solution of an amino group-containing (meth)acrylic polymers was prepared in the same manner as in Example 10. After mixing with stirring so as to adjust the solid content ratio of the above-mentioned two kinds of amino group-containing (meth)acrylic polymer solutions to 80:20, a (meth)acrylic film was obtained in the same manner as in Example 1.

The resulting film was subjected to the tensile test in the same manner as in Example 1. The results are shown in Table 1.

COMPARATIVE EXAMPLE 2

A film made of a mixture of a carboxyl group-containing (meth)acrylic polymer and a BA homopolymer was produced according to the following procedure.

First, 94 parts by weight of methyl methacrylate (MMA) and 5 parts by weight of acrylic acid (AA) were dissolved in 150 parts by weight of methyl ethyl ketone (MEK) and, after adding 0.5 parts by weight of azobis(2,4-dimethylvaleronitrile) (AVN) as a polymerization initiator, the mixture was reacted in a nitrogen atmosphere at 50° C. for 20 hours to obtain a MEK solution of a carboxyl group-containing (meth)acrylic polymer. The resulting carboxyl group-containing (meth)acrylic polymer had a weight-average molecular weight of 160,000 and Tg of 105° C.

Then, 100 parts by weight of n-butyl acrylate (BA) was dissolved in 150 parts by weight of methyl ethyl ketone (MEK) and, after adding 0.5 parts by weight of azobis(2,4-dimethylvaleronitrile) (AVN) as a polymerization initiator, the mixture was reacted in a nitrogen atmosphere at 50° C. for 20 hours to obtain a MEK solution of a BA homopolymer. After mixing with stirring so as to adjust the solid content ratio of the above-mentioned two kinds of polymer solutions to 80:20, a (meth)acrylic film was obtained in the same manner as in Example 1.

The resulting film was subjected to the tensile test in the same manner as in Example 1. The results are shown in Table 1.

COMPARATIVE EXAMPLE 3

A film made of a mixture of two kinds of carboxyl group-containing (meth)acrylic polymers was produced according to the following procedure.

First, a MEK solution of a carboxyl group-containing (meth)acrylic polymer was prepared in the same manner as in Comparative Example 2. Then, a MEK solution of a carboxyl group-containing (meth)acrylic polymer was prepared in the same manner as in Example 1. After mixing with stirring so as to adjust the solid content ratio of the above-mentioned two kinds of polymer solutions to 80:20, a (meth)acrylic film was obtained in the same manner as in Example 1.

The resulting film was subjected to the tensile test in the same manner as in Example 1. The results are shown in Table 1.

COMPARATIVE EXAMPLE 4

A film made of a (meth)acrylic polymer having a carboxyl group and an amino group was produced according to the following procedure.

First, 65.8 parts by weight of methyl methacrylate (MMA), 4.2 parts by weight of dimethylaminoethyl methacrylate (DMAEMA), 28.2 parts by weight of n-butyl acrylate (BA) and 1.8 parts by weight of acrylic acid (AA) were dissolved in 150 parts by weight of methyl ethyl ketone (MEK) and, after adding 0.5 parts by weight of azobis(2,4-dimethylvaleronitrile) (AVN) as a polymerization initiator, the mixture was reacted in a nitrogen atmosphere at 50° C. for 20 hours to obtain a MEK solution of a (meth)acrylic polymer having a carboxyl group and an amino group. The resulting polymer had a weight-average molecular weight of 180,000 and Tg of 37° C.

Then, the resulting polymer solution was applied on a 38 μm released polyester carrier film (manufactured by TEIJIN LIMITED under the trade name of Purex™ A-71) so that the resulting film has a thickness of 50 μm after drying, and then dried at 100° C. for 20 minutes to obtain a (meth)acrylic film.

The resulting film was subjected to the tensile test in the same manner as in Example 1. The results are shown in Table 1.

COMPARATIVE EXAMPLE 5

A polyvinyl chloride film (manufactured by Sumitomo 3M Ltd. under the trade name of 3650CF) was subjected to the tensile test in the same manner as in Example 1. The results are shown in Table 1.

COMPARATIVE EXAMPLE 6

With respect to a polyvinyl chloride film coated with an adhesive (manufactured by Sumitomo 3M Ltd. under the trade name of Scotchcal Film JS1900A), the surface gloss retention (%) and color difference were measured in the same manner as described above. The results are shown in Table 2.

TABLE 1

| | Acrylic polymer | | Solid content ratio | At 25° C. | | At 5° C. | |
|---|---|---|---|---|---|---|---|
| | Tg > 0° C. | Tg < 0° C. | (% by weight) | Tensile strength (MPa) | Elongation (%) | Tensile strength (MPa) | Elongation (%) |
| Example 1 | H-1 MMA/DMAEMA (94:6) | S-1 BA/AA (94:6) | 80:20 | 48 | 27 | 61 | 12 |
| Example 2 | H-1 MMA/DMAEMA (94:6) | S-1 BA/AA (94:6) | 70:30 | 38 | 100 | 50 | 50 |
| Example 3 | H-1 MMA/DMAEMA (94:6) | S-1 BA/AA (94:6) | 60:40 | 29 | 160 | 45 | 60 |
| Example 4 | H-1 MMA/DMAEMA (94:6) | S-1 BA/AA (94:6) | 50:50 | 19 | 284 | 34 | 160 |
| Example 5 | H-1 MMA/DMAEMA (94:6) | S-1 BA/AA (94:6) | 40:60 | 8 | 500 | 20 | 324 |
| Example 6 | H-1 MMA/DMAEMA (94:6) | S-2 EA/AA (94:6) | 55:45 | 30 | 250 | 65 | 50 |
| Example 7 | H-1 MMA/DMAEMA (94:6) | S-3 2-EHA/AA (90:1) | 65:35 | 25 | 110 | 35 | 50 |

TABLE 1-continued

|  | Acrylic polymer | | Solid content ratio | At 25° C. | | At 5° C. | |
|---|---|---|---|---|---|---|---|
|  | Tg > 0° C. | Tg < 0° C. | (% by weight) | Tensile strength (MPa) | Elongation (%) | Tensile strength (MPa) | Elongation (%) |
| Example 8 | H-2 MMA/BA/DMAEMA (64:30:6) | S-1 BA/AA (94:6) | 70:30 | 20 | 340 | 42 | 140 |
| Example 9 | H-2 MMA/BA/DMAEMA (64:30:6) | S-1 BA/AA (94:6) | 60:40 | 6 | 444 | 31 | 324 |
| Example 10 | H-3 MMA/MAA (95:5) | S-4 BA/DMAEA (90:10) | 55:45 | 20 | 80 | 25 | 80 |
| Example 11 | H-3 MMA/MAA (95:5) | S-5 BA/DMAPAA (94:6) | 50:50 | 15 | 200 | 25 | 200 |
| Example 12 | H-4 MMA/BMA/MAA (55:40:5) | S-5 BA/DMAPAA (94:6) | 75:25 | 35 | 160 | 55 | 50 |
| Example 13 | H-5 BMA/MAA (95:5) | S-6 BA/Vim (92.5:7.5) | 80:20 | 20 | 280 | 32 | 80 |
| Example 14 | BMA/BA/DMAEMA (79:15:6) | BA/AA (94:6) | 53:47 | 21 | 266 | 34 | 168 |
| Example 15 | BMA/BA/DMAEMA (79:15:6) | BA/AA (94:6) | 53:47 | 20 | 285 | 37 | 169 |
| Example 16 | BMA/BA/DMAEMA (79:15:6) | BA/AA (94:6) | 53:47 | 18 | 237 | 32 | 185 |
| Example 17 | BMA/BA/DMAEMA (79:15:6) | BA/AA (94:6) | 53:47 | 16 | 244 | 37 | 173 |
| Example 18 | MMA/BMA/MAA/AA (77:15:6:2) | BA/AA (94:6) | 53:47 | 19 | 311 | 32 | 145 |
| Example 19 | MMA/BMA/MAA/AA (77:15:6:2) | BA/AA (94:6) | 53:47 | 18 | 242 | 32 | 224 |
| Comparative Example 1 | H-1 MMA/DMAEMA (94:6) | S-5 BA/DMAPAA (94:6) | 80:20 | 16 | 4 | 15 | 4 |
| Comparative Example 2 | H-6 MMA/AA (94:6) | S-7 BA Homopolymer | 80:20 | 8 | 5 | 7 | 5 |
| Comparative Example 3 | H-6 MMA/AA (94:6) | S-1 BA/AA (94:6) | 80:20 | 7 | 5 | 25 | 5 |
| Comparative Example 4 | MMA/DMAEMA/BA/AA (65.8:4.2:28.2:1.8) | | — | 50 | 10 | 50 | 10 |
| Comparative Example 5 | Polyvinyl chloride film | | — | 26 | 240 | 48 | 14 |

TABLE 2

|  | Surface gloss retention (%) | Color difference |
|---|---|---|
| Example 2 | 96 | 1.1 |
| Example 4 | 100 | 0.2 |
| Example 5 | 104 | 0.2 |
| Example 14 | 101 | 0.8 |
| Example 15 | 105 | 0.9 |
| Example 16 | 105 | 1.3 |
| Example 17 | 99 | 0.6 |
| Example 18 | 99 | 0.8 |
| Example 19 | 98 | 0.7 |
| Comparative Example 6 | 97 | 1.1 |

What is claimed is:

1. A (meth)acrylic film formed of: (A) a carboxyl group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having a carboxyl group, and (B) an amino group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having an amino group, wherein a mixing ratio of the component (A) to the component (B) is from 10:90 to 90:10 in terms of a weight ratio and wherein component A and component B are crosslinked.

2. A (meth)acrylic film formed of: (A) a carboxyl group-containing (meth)acrylic polymer having a glass transition temperature (Tg) of 0° C. or higher and a weight-average molecular weight of 10,000 or more obtained by copolymerizing a composition containing a monoethylenically unsaturated monomer as a main component and an unsaturated monomer having a carboxyl group, (B) an amino group-containing (meth)acrylic polymer having a glass transition temperature (Tg) of 0° C. or lower and a weight-average molecular weight of 10,000 or more obtained by copolymerizing a composition containing a monoethylenically unsaturated monomer as a main component and an unsaturated monomer having an amino group, and (C) a crossliniking agent containing functional groups which can react with said carboxyl group, wherein a mixing ratio of the component (A) to the component (B) is from 10:90 to 90:10 in terms of a weight ratio.

3. The (meth)acrylic film according to any one of claims 1 or 2, wherein the amino group is a tertiary amino group.

4. The (meth)acrylic film according to any one of claims 1 or 2, wherein the monoethylenically unsaturated monomer is an alkyl (meth)acrylate ester and an alkyl group has 1 to 12 carbon atoms on average.

* * * * *

UNITED STATES PATENT AND TRADEMARK OFFICE
CERTIFICATE OF CORRECTION

| | | |
|---|---|---|
| PATENT NO. | : 7,691,948 B2 | Page 1 of 1 |
| APPLICATION NO. | : 10/569113 | |
| DATED | : April 6, 2010 | |
| INVENTOR(S) | : Yorinobu Takamatsu | |

It is certified that error appears in the above-identified patent and that said Letters Patent is hereby corrected as shown below:

Column 6
Line 60; Delete "azirizine" and insert -- aziridine --, therefor.

Column 9
Line 43; Delete "transferrability" and insert -- transferability --, therefor.

Column 23
Line 4; In Claim 2, delete "crossliniking" and insert -- crosslinking --, therefor.

Signed and Sealed this
First Day of May, 2012

David J. Kappos
*Director of the United States Patent and Trademark Office*